United States Patent
Piltonen et al.

(10) Patent No.: US 10,554,550 B2
(45) Date of Patent: Feb. 4, 2020

(54) METHOD, APPARATUS AND SYSTEM FOR TRANSMITTING AND RECEIVING DATA PACKETS

(71) Applicant: Arm Finland OY, Oulu (FI)

(72) Inventors: Joni Piltonen, Oulu (FI); Mikko Saarnivala, Oulu (FI)

(73) Assignee: ARM FINLAND OY (FI)

( * ) Notice: Subject to any disclaimer, the term of this patent is extended or adjusted under 35 U.S.C. 154(b) by 15 days.

(21) Appl. No.: 15/691,022

(22) Filed: Aug. 30, 2017

(65) Prior Publication Data

US 2018/0006940 A1 Jan. 4, 2018

Related U.S. Application Data

(63) Continuation of application No. 13/942,809, filed on Jul. 16, 2013, now Pat. No. 9,774,528.

(30) Foreign Application Priority Data

Jul. 18, 2012 (FI) ..................................... 20125807

(51) Int. Cl.
  *H04L 12/741* (2013.01)
  *H04L 12/733* (2013.01)
  *H04L 12/761* (2013.01)

(52) U.S. Cl.
  CPC .............. *H04L 45/74* (2013.01); *H04L 45/16* (2013.01); *H04L 45/20* (2013.01)

(58) Field of Classification Search
  CPC .......... H04L 45/74; H04L 45/16; H04L 45/20
  See application file for complete search history.

(56) References Cited

U.S. PATENT DOCUMENTS

| 5,295,154 | A  | 3/1994  | Meier et al. |
| 6,556,574 | B1 | 4/2003  | Pearce et al. |
| 6,829,230 | B1 | 12/2004 | Tiuri |
| 7,398,322 | B1 * | 7/2008 | Perlman ................ H04L 12/462 709/238 |
| 7,587,757 | B2 | 9/2009  | Scoggins et al. |

(Continued)

FOREIGN PATENT DOCUMENTS

| WO | 9702680 A1    | 1/1997 |
| WO | 2009072699 A1 | 1/2009 |

OTHER PUBLICATIONS

Finnish Patent Application No. 20125807, date May 3, 2013.
Finnish Office Action for Patent Application No. 20125807, dated Mar. 27, 2014.

*Primary Examiner* — Andrew Lai
*Assistant Examiner* — Chuong M Nguyen
(74) *Attorney, Agent, or Firm* — Barnes & Thornburg LLP

(57) ABSTRACT

A method and an apparatus for routing data packets. The solution in a communication network including a set of nodes, storing information regarding nodes of the network; and when transmitting a data packet to a destination node in the network, determining and including in the data packet the recipient identification; determining and including in the data packet the direction of the destination node in the network; determining and including in the data packet a hop count indicator indicating the number of node-to-node hops to the destination node; setting in the data packet the transmission direction indicator equal to a value corresponding to direction down and transmitting the packet.

20 Claims, 5 Drawing Sheets

(56) References Cited

U.S. PATENT DOCUMENTS

| | | |
|---|---|---|
| 7,720,006 B1 | 5/2010 | Yadav |
| 7,738,859 B2 | 6/2010 | Roy et al. |
| 7,813,326 B1 | 10/2010 | Kelm |
| 2002/0062388 A1* | 5/2002 | Ogier ............... H04L 45/26 709/238 |
| 2005/0117526 A1* | 6/2005 | Melnik ............... H04L 45/00 370/254 |
| 2005/0232285 A1 | 10/2005 | Terrell et al. |
| 2006/0013154 A1 | 1/2006 | Choi |
| 2006/0221949 A1* | 10/2006 | Anjum ............... H04L 45/00 370/389 |
| 2008/0002599 A1 | 1/2008 | Yau et al. |
| 2008/0123584 A1* | 5/2008 | Behrendt ............ H04B 7/2606 370/315 |
| 2010/0195649 A1* | 8/2010 | Miyata ............... H04L 12/42 370/390 |
| 2011/0219208 A1 | 9/2011 | Asaad et al. |
| 2011/0286396 A1* | 11/2011 | Kato ............... H04W 92/02 370/328 |

* cited by examiner

US 10,554,550 B2

METHOD, APPARATUS AND SYSTEM FOR TRANSMITTING AND RECEIVING DATA PACKETS

PRIORITY CLAIM

This patent application is a continuation of U.S. patent application Ser. No. 13/942,809, filed Jul. 16, 2013, which claims priority to Finnish Patent Application No. 20125807, filed 18 Jul. 2012, the disclosure of which being incorporated herein by reference in its entirety.

FIELD

Disclosed embodiments relate to a method, an apparatus and a system for routing data packets. In particular, disclosed embodiments relate to routing data packets in a network comprising low memory resource nodes.

BACKGROUND

The following description of background art may include insights, discoveries, understandings or disclosures, or associations together with disclosures not known to the relevant art prior to the present disclosed embodiments but provided by the disclosed embodiments. Some of such contributions may be specifically pointed out below, whereas other such contributions will be apparent from their context.

In modern communication and computer networks, data exchange between programs and computers is a vital element. Different programs, computers and processors exchange data without human intervention. This kind of communication is usually called machine-to-machine (M2M) communications.

An example of a network technology where M2M communication is widely applied is a low-power wireless network, such as an IEEE 802.15.4 based embedded and sensor network. More recently, as machine-to-machine devices have become IP enabled, systems have become more open by using IP as a networking protocol.

In typical M2M networks the devices or nodes connected to the networks, communicate with each other. Networks may have a connection to the Internet or other external network, and in such a case the nodes may communicate with devices outside the M2M network.

For the nodes to be able to communicate, a routing protocol is required. Routing protocols and techniques can divided very roughly into two groups: those utilizing a storing mode and those utilizing source or flow routing techniques. A storing mode requires that each device participating in routing maintains a routing table of downward routes. This requires the devices to have relatively large memory capabilities. In source routing, routing information is attached each transmitted packet. This reduces the payload of the packets.

SUMMARY

Disclosed embodiments provide a solution for routing data packets.

At least one disclosed embodiment provides an apparatus, in a first communication network comprising a set of apparatuses, the apparatus comprising at least one processor; and at least one memory including computer program code, the at least one memory and the computer program code configured to, with the at least one processor, cause the apparatus at least to perform: control communication with apparatuses operationally connected to the apparatus by transmitting and receiving data packets, the data packets comprising a recipient identification, a transmission direction indicator, and depending on the transmission direction indicator, a hop count indicator.

Another disclosed embodiment provides an apparatus, in a first communication network comprising a set of nodes, the apparatus comprising at least one processor; and at least one memory including computer program code, the at least one memory and the computer program code configured to, with the at least one processor, cause the apparatus at least to perform: store information regarding nodes of the communication network; and when transmitting a data packet to a destination node in the communication network, determine and include in the data packet the recipient identification; determine and include in the data packet the direction of the destination node in the network; determine and include in the data packet a hop count indicator indicating the number of node-to-node hops to the destination node; set and include in the data packet the transmission direction indicator equal to a value corresponding to direction down; transmit the packet.

Yet another disclosed embodiment provides a method, in an apparatus, comprising controlling communication with one or more apparatuses; transmitting and receiving data packets comprising a recipient identification, a transmission direction indicator, and depending on the transmission direction indicator, a hop count indicator.

A further disclosed embodiment provides a method, in an apparatus in a first communication network comprising a set of nodes, comprising storing information regarding nodes of the communication network; and when transmitting a data packet to a destination node in the communication network, determining and including in the data packet the recipient identification; determining and including in the data packet the direction of the destination node in the network; determining and including in the data packet a hop count indicator indicating the number of node-to-node hops to the destination node; setting and including in the data packet the transmission direction indicator equal to a value corresponding to direction down; transmitting the packet.

BRIEF DESCRIPTION OF THE DRAWINGS

Disclosed embodiments are described below, by way of example only, with reference to the accompanying drawings, in which.

DETAILED DESCRIPTION OF THE DISCLOSED EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Data exchange between programs and computers is a vital element. Different programs, computers and processors may exchange data without human intervention. Different networks and protocols are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination. Above TCP/IP, the Hypertext Transfer Protocol (HTTP) is used as a client/server protocol. A program may send an HTTP request to a server which responds with another HTTP message.

Low-power wireless networks, such as IEEE 802.15.4 based embedded and sensor networks, have extremely limited resources for transmitting packets. These networks are very energy-efficient, and the chip technology is cheap. For this reason the technology is making its way to embedded devices very quickly for automation, measurement, tracking and control, for example.

State-of-the-art routing algorithms meant for normal backbone wired networks or ad-hoc wireless mesh protocols meant for high-performance Wireless Local Area Networks (WLAN, WiFi), are not suitable for extremely constrained networks such as IEEE 802.15.4 where node resources are very limited, or networks must scale to large numbers of nodes.

In many cases, low-power wireless networks and other M2M networks resemble a tree-like structure where an access point is connected to a given number of network nodes. The access point takes care of the connections of the network to external networks such as the Internet.

Figure 1:
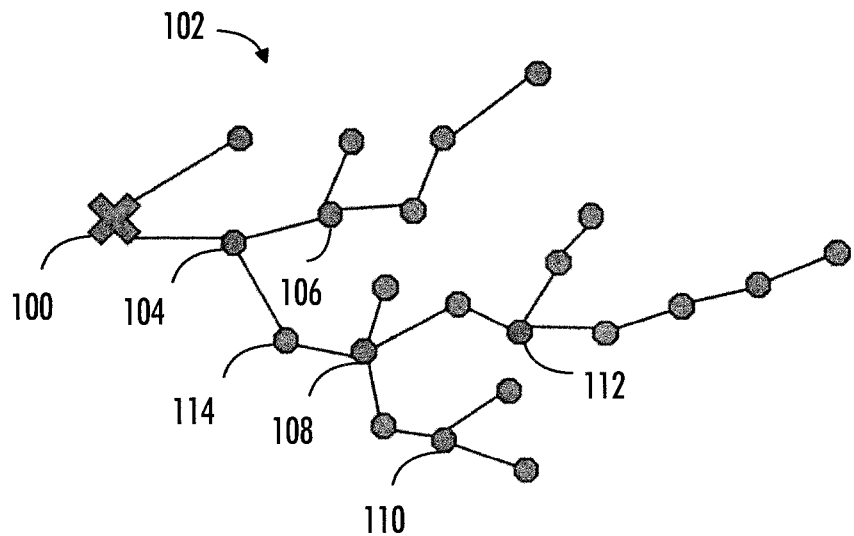
FIG. 1 illustrates a simple example of the tree-like structure of a M2M network.

FIG. 1 illustrates a simple example of the tree-like structure of a M2M network. The network comprises an access point 100 and a set of nodes 102 connected to the access point either directly or via other nodes. The connections within the networks (between the nodes and between the access point and the nodes) are in many networks realized typically with wireless connections but they may be wired connections as well. The transmission direction from a node towards the access point is usually referred as up direction and the opposite transmission direction as down direction.

Those nodes 104, 106, 108, 110 and 112 having more than one connection in the down directions may be referred as knots. In general, any node which receives data packets from another node and transmits the packets onwards may be called a router.

For the nodes to be able to communicate with each other, the access point and the external networks, some kind of routing protocol is required.

Basically, there are two types of routing protocols in use. The protocols of the first type require that each device participating in routing maintains a routing table of downward routes. The drawback of this is the amount of data memory that is required from the device to maintain the routing table information. A typical entry (with for example IPv6 addressing) in the table requires approximately 20 bytes of memory. One fairly common workaround for this problem is to store the routing table information in persistent memory such as flash (either on-chip or external). However, the problem with on-chip flash is that the access time to that storage is typically significantly slower than standard RAM which leads into reduced performance. Additionally common semiconductor technologies used to manufacture the on-chip flash limit the number of write operations to a single flash segment so that the lifetime of the part would be prohibitively reduced if this typically very volatile routing information would be stored on it. Typically protocols of this type are efficient in small to medium size networks.

The protocols of the second type, which may denotes a source routing, require that routing information is attached each transmitted packet. This reduces the payload of the packets. Where these protocols can be efficient in medium sized networks their shortcoming is in very deep networks. A very deep network could be one where the number of hops from the access point to the furthermost device (leaf of the network) is significantly larger than 10. With standard source routing each additional hop on a downward (from access point towards the edge of the network) will increase the routing overhead by at least 16 bytes (thus decreasing the available application payload). If the connections are realized with wireless connections, some wireless technologies have a hard limit to the maximum transmission unit (MTU). The increasing header size will lead into situation where even a small application payload packet would have to be fragmented on higher layers (such as on the IP layer). This will significantly reduce the overall performance (throughput) and scalability of the network. Additionally the fragmentation does not mitigate in any way the increased RAM consumption in routing devices caused by the larger header size (a routing device must be capable of storing and reassembling of all the fragments of a single packet). In fact the fragmentation makes the problem worse by adding more overhead information to the headers.

In at least one disclosed embodiment, the wireless links in the network may be realized by using IEEE 802.15.4, with Internet Protocol v6 IPv6 (6LowPAN), IEEE 802.15.4 with ZigBee, Bluetooth or Bluetooth Ultra Low Power (ULP), Low Power Wireless Local Area Network, proprietary low-power radio, cellular radio system or any other system suitable for low-power transmission. IEEE stands for the Institute of Electrical and Electronics Engineers.

In another disclosed embodiment, devices or apparatuses of the network communicate by transmitting and receiving data packets, the data packets comprising a recipient identification, a transmission direction indicator, and depending on the transmission direction indicator a hop count indicator.

Disclosed embodiments can be applied to virtually any networks and may be integrated into existing routing protocols as an enhancement or alternative mode of operation. The proposed solution is agnostic to the actual method how the network topology information is determined and delivered.

To be able to communicate with the network a node registers itself to the network. When a node is set up, it is configured to request from underlying routing protocol components the best possible parent. In this context, a parent means the next device towards the network access point in the network topology. As the proposed method does not take any part in determining the best path towards the access point it can be considered fully agnostic to the specifics of the underlying physical link technology. After receiving from the underlying routing protocol components the next hop towards the access point the node is capable of communicating with the access point. The full bi-directional communication capability is achieved when the node sends a registration message to the network access point.

Figure 2A:
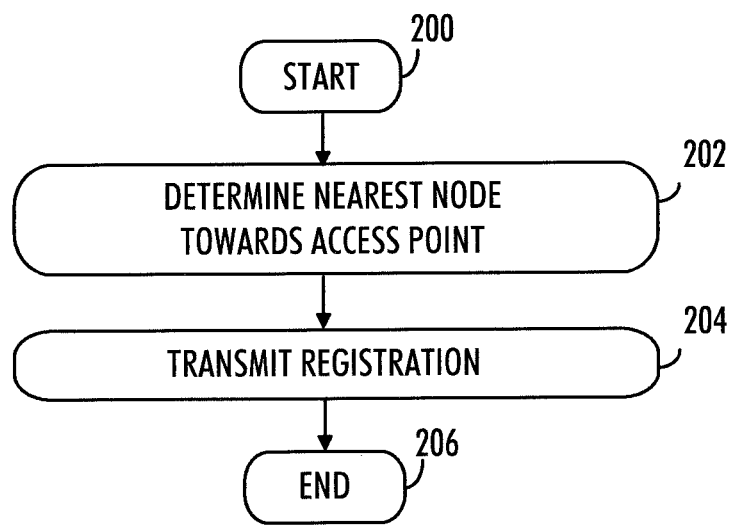
FIGS. 2A and 2B are flow charts illustrating an example of a registration procedure of a node.

FIG. 2A is a flow chart illustrating a simplified example of the registration procedure. The procedure starts at step 200.

In step 202, the node determines the nearest or best node towards the access point of the network. Typically this information may be obtained from the underlying routing protocol components such as from the IPv6 Neighbor Discovery protocol in IPv6 networks. For example, referring to FIG. 1, the parent of node 106 is node 104.

Regarding terminology, the transmission direction which is towards the access point of the network may be denoted as direction "up". The transmission direction which is away from the access point of the network may be denoted as direction "down".

Another point regarding terminology, a node of the network which is nearest in the direction away from the access point (direction "down") may be denoted a child. A node may have one or more child nodes. For example, referring to FIG. 1, the node 104 has two child nodes, 106 and 114. Node 114 in turn has one child node 108. The nodes having more than one child nodes may be called knots.

In step 204, the node transmits a registration message to the access point. In at least one disclosed embodiment, the message comprises the identification of the apparatus, a lifetime indicator of the information in the message, an identification of the node which is next in the up transmission direction (i.e., the parent) and a transmission direction indicator equaling a value corresponding to direction up. The identification may in theory be of any type and size. As an example, IPv6 addresses have been successfully used as node identifiers. The lifetime indicator indicates the access point how long the transmitted information is valid. The transmission direction indicator is used in the routing procedure as will be explained below.

The process ends in step 206.

Figure 2B:
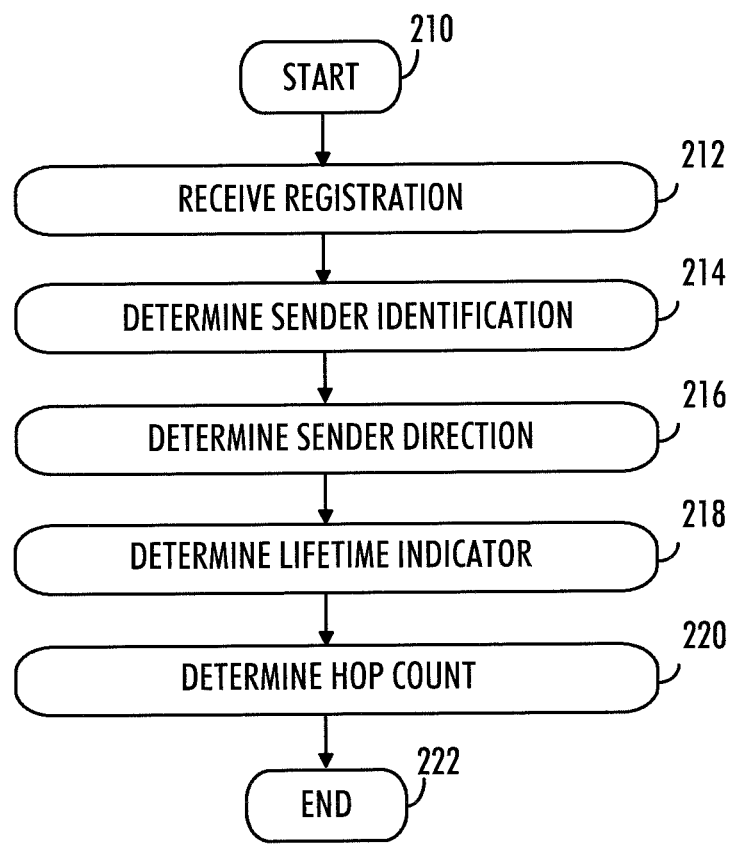

FIG. 2B is a flow chart illustrating a simplified example of the registration procedure from point of view of the access point. The procedure starts at step 210.

In step 212, the access point receives a registration message from a node.

In step 214, the access point is configured to determine the identification of the sender of the registration message.

In step 216, the access point is configured to determine the direction of the sender of the registration message in the network. The structure of the network may be such that there is more than one branch of the network leaving from the access point. Referring to FIG. 1, there are two branches leaving form the access point 100. The direction corresponds to the identification of the first node in the branch. The access point may determine the identification from the registration message as the message includes the identification of the last node that forwarded the message to the access point.

In step 218, the access point is configured to determine the lifetime indicator from the registration message.

In step 220, the access point determines the hop count to the sender. The hop count is the number of hops starting from the access point that must be performed in the network from a node to node to reach the sender of the registration message. For example, referring to FIG. 1 the hop count to reach node 112 from the access point is 5.

The process ends in step 222.

In at least one disclosed embodiment, the access point stores a list of nodes, a routing table, where each entry represents a destination node that has reported its parent. The hop count may be determined using the following procedure:

1. A node is browsed from this list.
2. A parent of the node is retrieved from the list.
3. Step 2 is repeated also for parent's parent until the last parent is the access point itself.

With this mechanism, it is possible to calculate the hop of any given node, even though the node itself doesn't know its exact hop count when registering. It should be noted that the above procedure is merely an example of a method to determine hop length.

In the network of FIG. 1, there are basically following kinds of communication: nodes transmitting to other nodes, nodes transmitting to access point or an external network, and access point transmitting to nodes or access point transmitting to an external network.

When nodes are transmitting to other nodes, all traffic is directed first to the access point as the nodes are not aware of the network structure or the location of the other nodes.

Figure 3A:
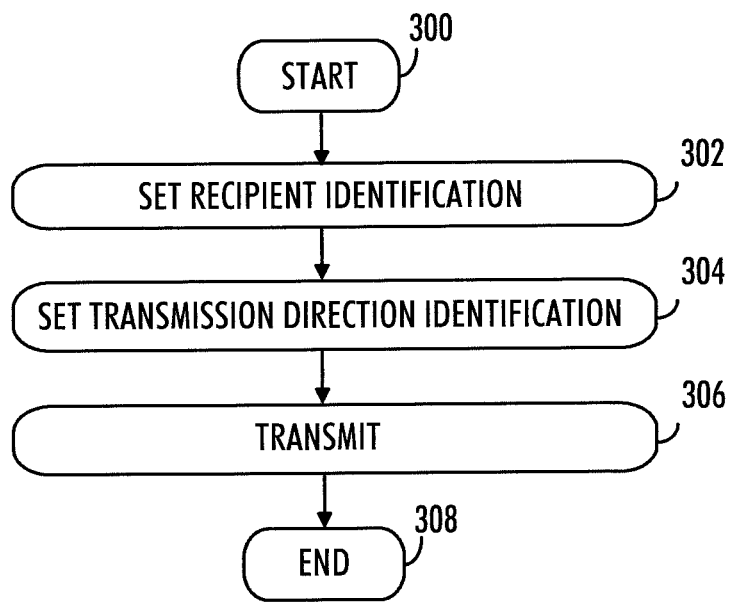
FIGS. 3A and 3B are flow charts illustrating transmitting and receiving a data packet.

FIG. 3A is a flow chart illustrating a simplified example of a node transmitting a data packet either to another node or to the access point. The procedure starts at step 300.

In step 302, the node determines the recipient identification. As an example, IPv6 address may be used as identifiers.

In step 304, the node sets a transmission direction indicator equaling a value corresponding to direction up.

In step 306, the node transmits the data packet including the recipient id and the transmission direction indicator.

The process ends in step 308.

Figure 3B:
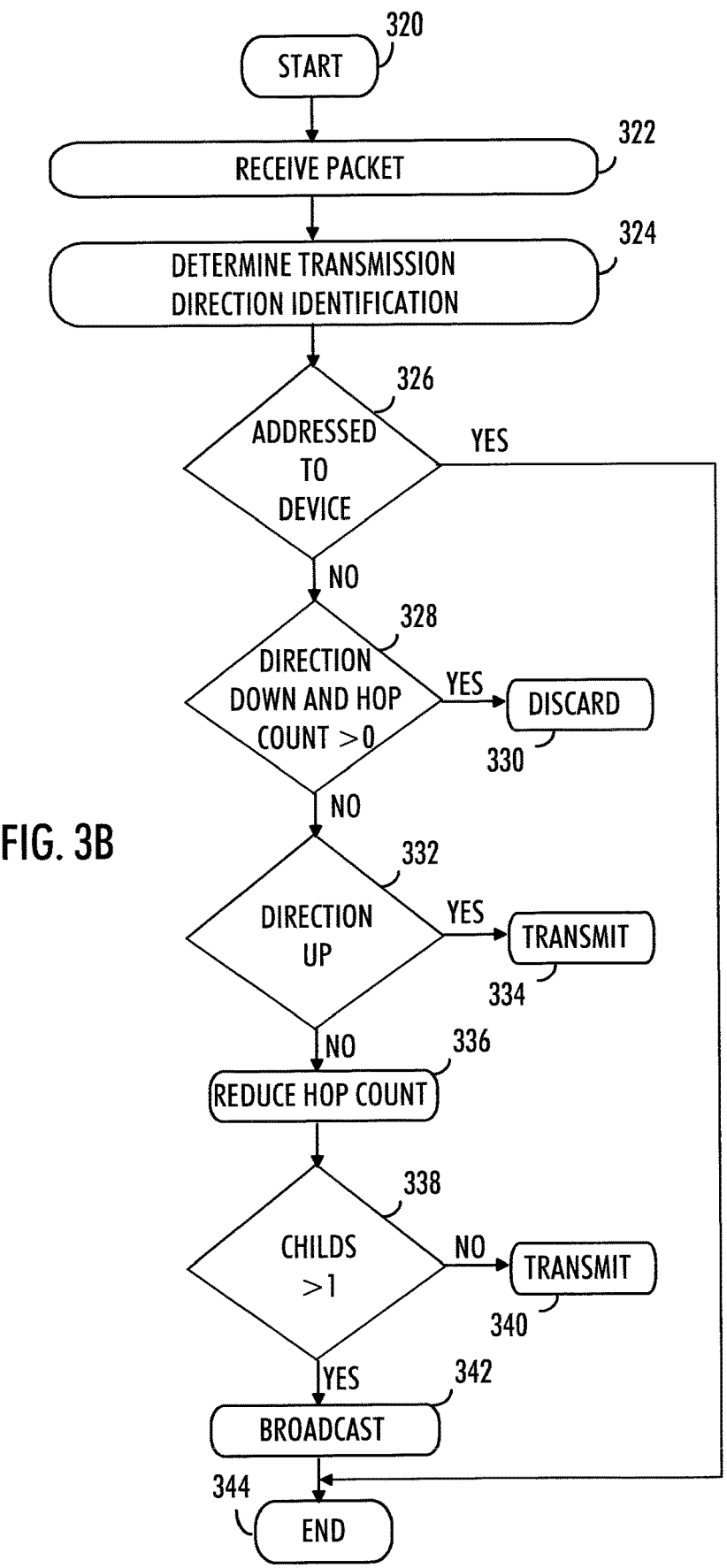

FIG. 3B is a flow chart illustrating a simplified example of a node receiving a data packet either from another node or from an access point. The procedure starts at step 320.

In step 322, the node receives a data packet. As connections between the nodes are typically realized with wireless connection the node is not directly aware from which node or from which direction the data packet arrived.

In step 324, the node is configured to determine the transmission direction indicator of the data packet. The indicator may typically have two possible values, a value corresponding to direction up and another value corresponding to direction down.

In step 326, the node determines whether it is the recipient of the data packet. If it is, it processes the data if required and the process ends in step 344.

In step 328, the node determines, if the transmission direction indicator value corresponds to direction down, whether the hop count indicator equals zero. If this is the case the data packet is discarded in step 330 and the process ends in step 344.

In step 332, the node checks whether the transmission direction indicator equals the value corresponding to direction up. If so; it transmits the data packet forward in step 334 and the process ends in step 344. The recipient id and transmission direction indicator values remain the same in the transmission compared to the received data packet.

Otherwise, the node reduces the value of the hop count indicator by one in step 336.

In step 338, where the transmission direction indicator equals a value corresponding to direction down, it is determined whether the number of child nodes of the node is greater than one. If this is not the case, the data packet is transmitted in step 340 and the process ends in step 344. Compared to the received data packet, the recipient id and transmission direction indicator values remain the same but the hop count has reduced by one.

If the number of child nodes was greater than one, the node broadcasts the data packet in step 342. Compared to the received data packet, the recipient id and transmission direction indicator values remain the same but the hop count has reduced by one.

The process ends in step 344.

The difference between broadcast and regular transmission is that a broadcasted packet comprises information that the packet is to be received by everyone who receives the transmission.

In at least one disclosed embodiment, a node stores only limited information regarding surrounding nodes of the network. For example, a node may store the id of its parent and up to two child nodes. If it has more than two child nodes, it has no information regarding their ids. If a node has only one child and a data packet is transmitted with a direction indicator value corresponding to direction down the node may indicate in a Mac layer field of the data packet that the recipient of the transmission is the child.

Thus in at least one disclosed embodiment, in a situation where a routing node has multiple child nodes, i.e. the node forms a knot in the network topology, an alternative mechanism to route packets is proposed. The up packets are forwarded as before but a different procedure is proposed for down packets. The headers of data packets do not contain any information as to which one of the child nodes they should be forwarded to. This is why the proposed method resorts into delivering the packet to all of the routing node's neighbors. As the delivery can be implemented using a low level broadcast message the packet might be received also by the parent device of the routing node. It is however simple for the parent device to drop the packet immediately based on the direction bit information and the source address of the packet. If the direction is down and the source is not the parent of a node the node has to drop the packet. The child nodes of the routing node however do not have any means to filter this packet. Thus the packet is forwarded to all the child nodes of these child nodes.

Figure 4A:
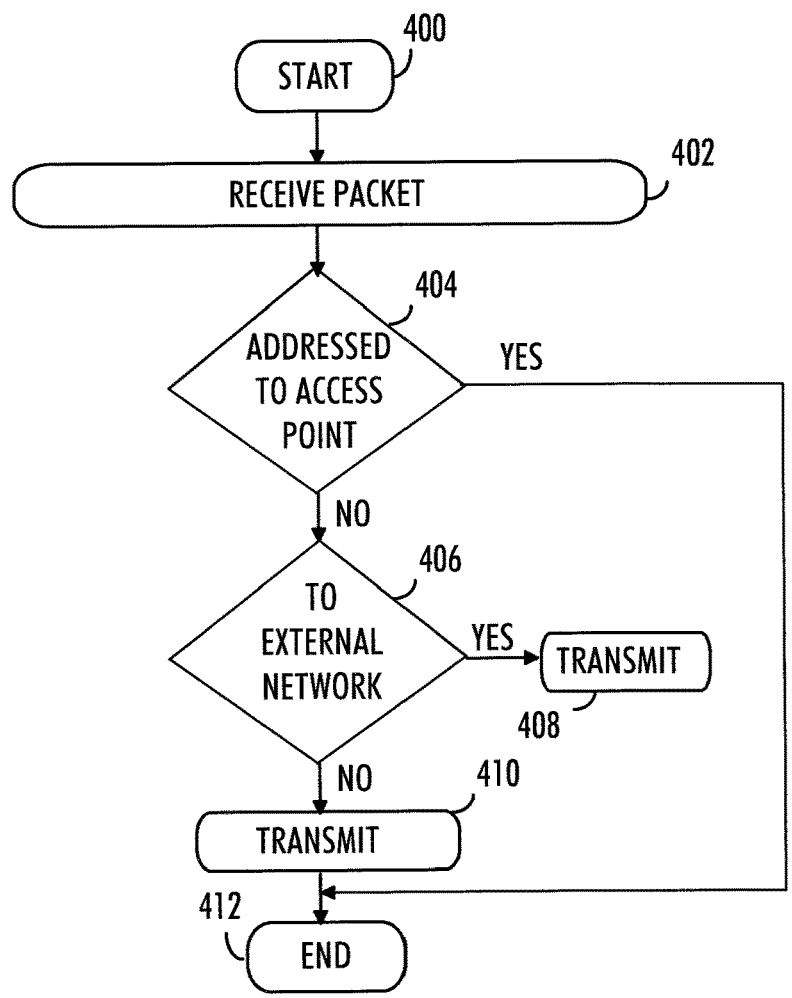
FIGS. 4A and 4B are flow charts illustrating transmitting and receiving a data packet.

FIG. 4A is a flow chart illustrating a simplified example of an access point receiving a data packet from a node. The procedure starts at step 400.

In step 402, the access point receives a data packet.

In step 404, the access point determines the recipient identification. If it determines that it is the recipient of the data packet, it processes the data if required and the process ends in step 412.

Otherwise, in step 406, the access point is configured to determine if the data packet is addressed to external network. If so, it transmits 408 the packet to the network and the process ends in step 412.

If the data packet is addressed to a node in the network under the access point the access point is configured to transmit the data packet to the recipient in step 410 and the process ends in step 412.

Figure 4B:
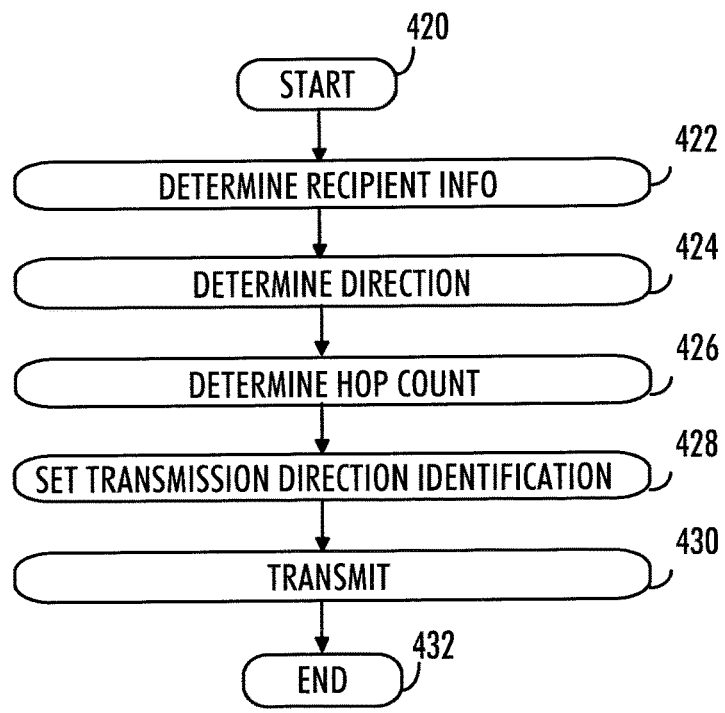

FIG. 4B is a flow chart illustrating a simplified example of an access point transmitting a data packet to a node. The procedure starts at step 420. The process is similar when the access point forwards a data packet it has received as described with FIG. 4A or when the data packet is generated by the access point.

In step 422, the access point determines the recipient identification.

In step 424, the access point determines the direction of the recipient in the network. The structure of the network may be such that there are more than one branches of the network leaving from the access point. Referring to FIG. 1, there are two branches leaving from the access point 100. The direction corresponds to the identification of the first node in the branch where the node is located. In at least one disclosed embodiment, this information is stored in the routing table kept by the access point.

In step 426, the access point determines the hop count to the recipient. The hop count is the number of hops starting from the access point that must be performed in the network from a node to node to reach the recipient of the data packet. In at least one disclosed embodiment, this information is stored in the routing table kept by the access point.

In step 428, the access point sets a transmission direction indicator equaling a value corresponding to direction down.

In step 430, the access point transmits the data packet including the recipient id, hop count and the transmission direction indicator to the direction of the recipient in the network.

The process ends in step 432.

Figure 5:
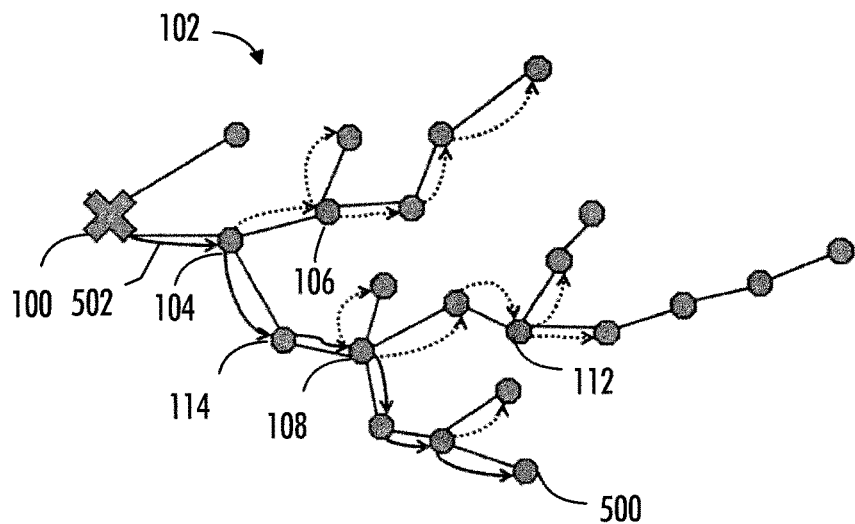
FIG. 5 illustrates a simplified example of the transmission of a data packet in the tree-like structure of a M2M network.

FIG. 5 illustrates a simplified example of the transmission of a data packet in the tree-like structure of a M2M network. The network comprises an access point 100 and a set of nodes 102. In this example, the access point 100 transmits a data packet to the node 500. Prior transmission the access point determines the hop count and the direction of node 500 in the network. In this case the hop count is 6 and the transmission should be directed to node 104 which is the first node in the branch where node 500 is located.

The access point transmits the data packet 502. The node 104 receives the packet, determines that it is not the recipient and forwards the data packet. As the number of child nodes of the node 104 is larger than one, the node 104 broadcasts the data packet so that all its neighbors receive the data packet, including the access point. The access point rejects the data packet as the packet has the transmission direction indicator equal to down. The data packet is received by nodes 106 and 114.

In FIG. 5, the correct path of the packet is designated with solid arrows and redundant path with dotted arrows. Each node that receives the data packet determines whether it is addressed to the node and if not forwards the packet either by transmitting or by broadcasting the packet. Thus, the data packet is transmitted on multiple routes of which only one is correct. However, in before each transmission or broadcast, the hop count is reduced by one. Thus, the redundant paths expire after 6 hops or if the packet reaches the end of a particular branch. On the correct path, when node 500 receives the data packet is determines that it is the correct recipient of the packet.

The proposed method reduces significantly the resource requirements for a typical network device that provides routing service for other devices in the network, i.e. a router node. More specifically, the required routing table size in a fully functional router is reduced to a static number of bytes and the routing header packet overhead is reduced to static number of bytes. The routing table size is not dependent on the size or topology of the network at all. Also the routing header size in a mesh routable packet is not dependent on the number of intermediate hops. Additionally the size of the routing header is almost static. Third major improvement from traditional routing methods is the reduction in the amount of routing and topology information that has to be stored in a network access point.

Figure 6:
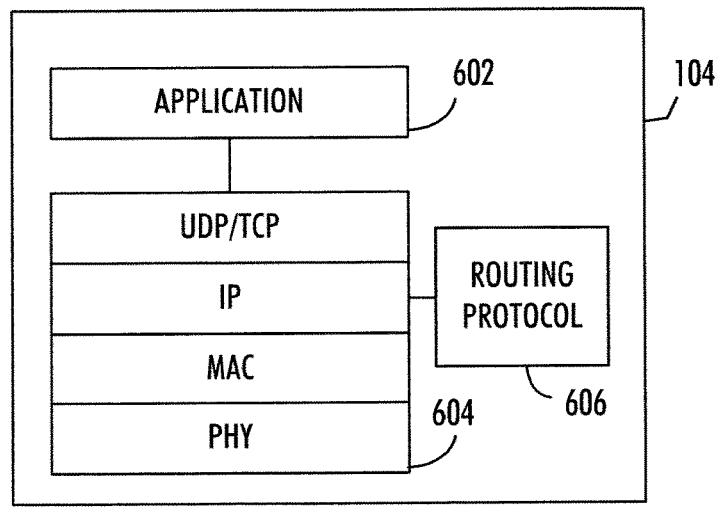
FIGS. 6 and 7 illustrate examples of apparatuses.

FIG. 6 illustrates an example of a routing node 104. The node comprises a protocol stack 604, a routing protocol component 606 and possible application logic 602 that is application specific (e.g., a home or building automation device function). The protocol stack 604 consists of the needed protocol layers for the network. Examples of possible protocol layers include User Datagram Protocol UDP, TCP, IPv6 6LoWPAN. The IEEE 802.15.4 Media Access Control+Physical Layer MAC+PHY is an example of a network stack.

Figure 7:
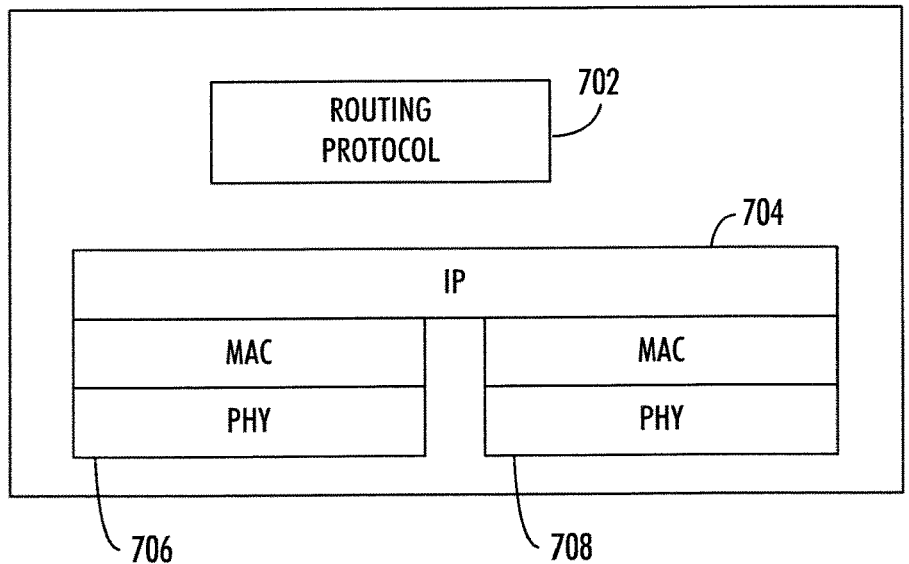

FIG. 7 illustrates an example of an access point node 100. In at least one disclosed embodiment, an access point consists of two network interfaces and corresponding network stacks 706, 708, a common layer between the stacks for forwarding 704 and a routing protocol component 702. First protocol stack 706 is used to communicate with the constrained network, for example using IPv6 6LoWPAN and an IEEE 802.15.4 MAC+PHY. The other protocol stack 708 is used to communicate with an external network, for example, the Internet using IPv6 and Ethernet.

Physically, a routing node and an access node may be realized with one or more processors, a memory operationally connected to the processor, a power source, and one or more transceivers or communication units. The memory may store software executable by the one or more processors.

Disclosed embodiments may be realized as software in a node, an access point, a computer or a set of computers connected to the Internet.

The software or computer programs may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital controller or it may be distributed amongst a number of controllers.

The software may comprise program steps which, when executed by one or more processors, realize the two network interfaces and corresponding network stacks, the common layer between the stacks for forwarding and the routing protocol component of the access node and the protocol stack, the routing protocol component and the possible application logic of the routing node.

It will be obvious to a person skilled in the art that, as technology advances, the inventive concept can be implemented in various ways. The disclosed embodiments are not limited to the examples described above but may vary within the scope of the claims.

The invention claimed is:

1. An apparatus in a set of one or more apparatuses of a first communication network, the apparatus comprising:
    at least one processor; and
    at least one memory storing computer program code and information on the number of child nodes of the apparatus,
    wherein the at least one memory and the computer program code are configured to, with the at least one processor, cause the apparatus at least to:
    control communication with apparatuses of the set by transmitting and receiving data packets, the data packets comprising a recipient identification, a transmission direction indicator, and depending on the transmission direction indicator, a hop count indicator, wherein the apparatus is configured to receive a data packet;
    determine the transmission direction indicator of the data packet;
    determine if the apparatus is the recipient of the data packet and process the packet if so;
    otherwise, if the transmission direction indicator equals a value corresponding to the direction down, determine whether the hop count indicator equals zero and if so, discard the data packet;
    otherwise, if the transmission direction indicator equals a value corresponding to direction up, transmit the data packet;
    otherwise, reduce the hop count indicator by one; and
    if the transmission direction indicator equals a value corresponding to direction down and the number of child nodes is larger than one, broadcast the data packet, otherwise if the number of child nodes is one, transmit the data packet to the child node.

2. The apparatus of claim 1, wherein the apparatus is configured to transmit and receive data packets comprising a transmission direction indicator having a value of two possible values corresponding to direction up and direction down.

3. The apparatus of claim 2, wherein the data packets comprise a hop count indicator if the transmission direction indicator equals a value corresponding to direction down.

4. The apparatus of claim 2, wherein the apparatus is configured to, when transmitting a packet originating from the apparatus, include in the packet:
    the recipient identification for the packet;
    the transmission direction indicator; and
    the hop count indicator if the transmission direction indicator equals a value corresponding to direction down.

5. The apparatus of claim 1, wherein the apparatus is configured to store information on apparatuses of the set.

6. The apparatus of claim 5, wherein the apparatus is configured to store information on one apparatus in the up transmission direction and up to two apparatuses in down transmission direction.

7. The apparatus of claim 1, wherein the apparatus is configured to register itself to the communication network by transmitting in the up transmission direction a message comprising the identification of the apparatus, a lifetime indicator and a transmission direction indicator equaling a value corresponding to direction up.

8. The apparatus of claim 1, wherein the apparatus is configured to broadcast a packet by setting, prior to the transmission of a packet, the Medium Access Layer address to the data packet to a broadcast value indicating the data packet is to be received by all apparatuses receiving the transmission.

9. The apparatus of claim 1, wherein the apparatus is configured to communicate wirelessly with at least one other apparatus of the communication network.

10. The apparatus of claim 1, wherein the apparatus is a node in the communication network.

11. A web service system comprising one or more apparatuses in a communication network comprising a set of apparatuses, a first apparatus of the set comprising:
    at least one processor, and at least one memory storing computer program code and information on a number of child nodes of the apparatus,
    wherein, the at least one memory and the computer program code are configured to, with the at least one processor, cause the first apparatus at least to:
    control communication with apparatuses of the set by transmitting and receiving data packets, the data packets comprising a recipient identification, a transmission direction indicator, and depending on the transmission direction indicator, a hop count indicator, wherein the first apparatus is configured to receive a data packet;
    determine the transmission direction indicator of the data packet;
    determine if the apparatus is the recipient of the data packet and process the packet if so;
    otherwise, if the transmission direction indicator equals a value corresponding to direction down, determine whether the hop count indicator equals zero and if so, discard the data packet;

otherwise, if the transmission direction indicator equals a value corresponding to direction up, transmit the data packet;

otherwise, reduce the hop count indicator by one, and if the transmission direction indicator equals a value corresponding to direction down and the number of child nodes is larger than one, broadcast the data packet to all apparatuses in communication therewith, otherwise if the number of child nodes is one, transmit the data packet to the child node.

12. The web service of claim 11, comprising:

a second apparatus in the communication network comprising: at least one processor, and at least one memory including computer program code, the at least one memory and the computer program code configured to, with the at least one processor, cause the second apparatus at least to perform:

store information regarding nodes of the communication network; and when transmitting a data packet to a destination node in the communication network, determine and include in the data packet the IPv6 address of the recipient;

determine the branch of the destination node in the network;

determine and include in the data packet a hop count indicator indicating the number of node-to-node hops to the destination node;

set and include in the data packet the transmission direction indicator equal to a value corresponding to direction down; and transmit the packet.

13. A method in an apparatus, comprising:

controlling communication with one or more apparatuses;

transmitting and receiving data packets comprising a recipient identification, a transmission direction indicator, and depending on the transmission direction indicator, a hop count indicator;

receiving a data packet;

determine the transmission direction indicator of the data packet;

determining if the apparatus is the recipient of the data packet and process the packet if so;

otherwise, if the transmission direction indicator equals a value corresponding to direction down, determining whether the hop count indicator equals zero and if so, discard the data packet;

otherwise, if the transmission direction indicator equals a value corresponding to direction up, transmitting the data packet;

otherwise, reducing the hop count indicator by one; and if the transmission direction indicator equals a value corresponding to direction down and a number of child nodes of the apparatus is larger than one, broadcasting the data packet to all apparatuses connected to the apparatus, otherwise if the number of child nodes of the apparatus is one, transmit the data packet to the child node.

14. The method of claim 13 further comprising:

transmitting and receiving data packets comprising a transmission direction indicator having a value of two possible values corresponding to direction up and direction down.

15. The method of claim 14 wherein the data packets comprise a hop count indicator if the transmission direction indicator equals a value corresponding to direction down.

16. The method of claim 14, further comprising:

when transmitting a packet originating from the apparatus, including in the packet:
    the recipient identification for the packet;
    the transmission direction indicator; and
    the hop count indicator if the transmission direction indicator equals a value corresponding to direction down.

17. The method of claim 13 further comprising:

storing information on apparatuses of a communication network the apparatus is connected to.

18. The method of claim 17 further comprising:

storing information on one apparatus in the up transmission direction and up to two apparatuses in down transmission direction.

19. The method of claim 13 further comprising:

registering the apparatus to the communication network by transmitting in the up transmission direction a message comprising the identification of the apparatus, a lifetime indicator and a transmission direction indicator equaling a value corresponding to direction up.

20. The method of claim 13 further comprising:

broadcasting a packet by setting, prior to the transmission of a packet, the Medium Access Layer address to the data packet to a broadcast value indicating the data packet is to be received by all apparatuses receiving the transmission.

\* \* \* \* \*